March 24, 1931. B. STREICHERT 1,798,006
AIRCRAFT PROPULSION
Filed April 2, 1930 3 Sheets-Sheet 1
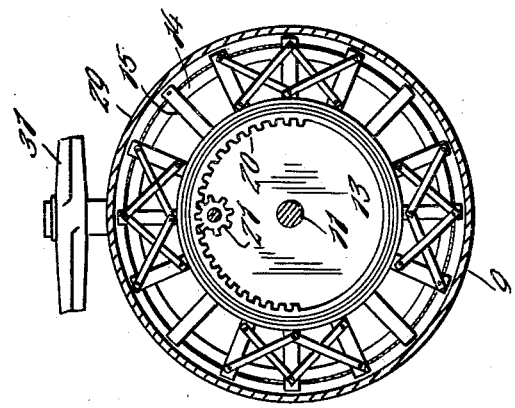
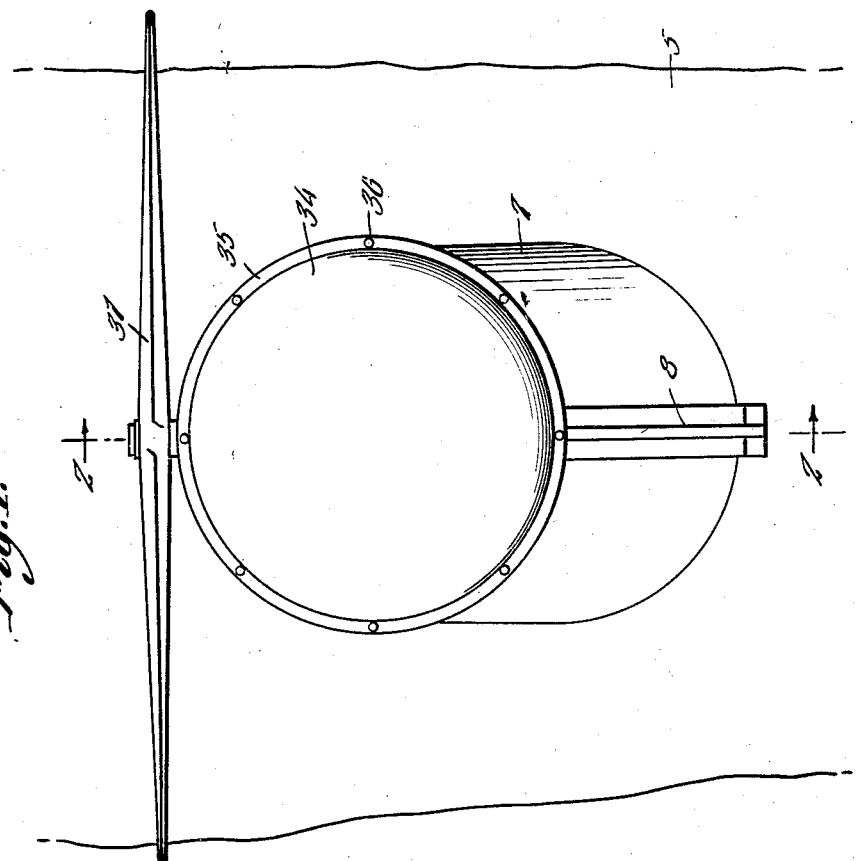
Inventor
B. Streichert
By Clarence A. O'Brien
Attorney

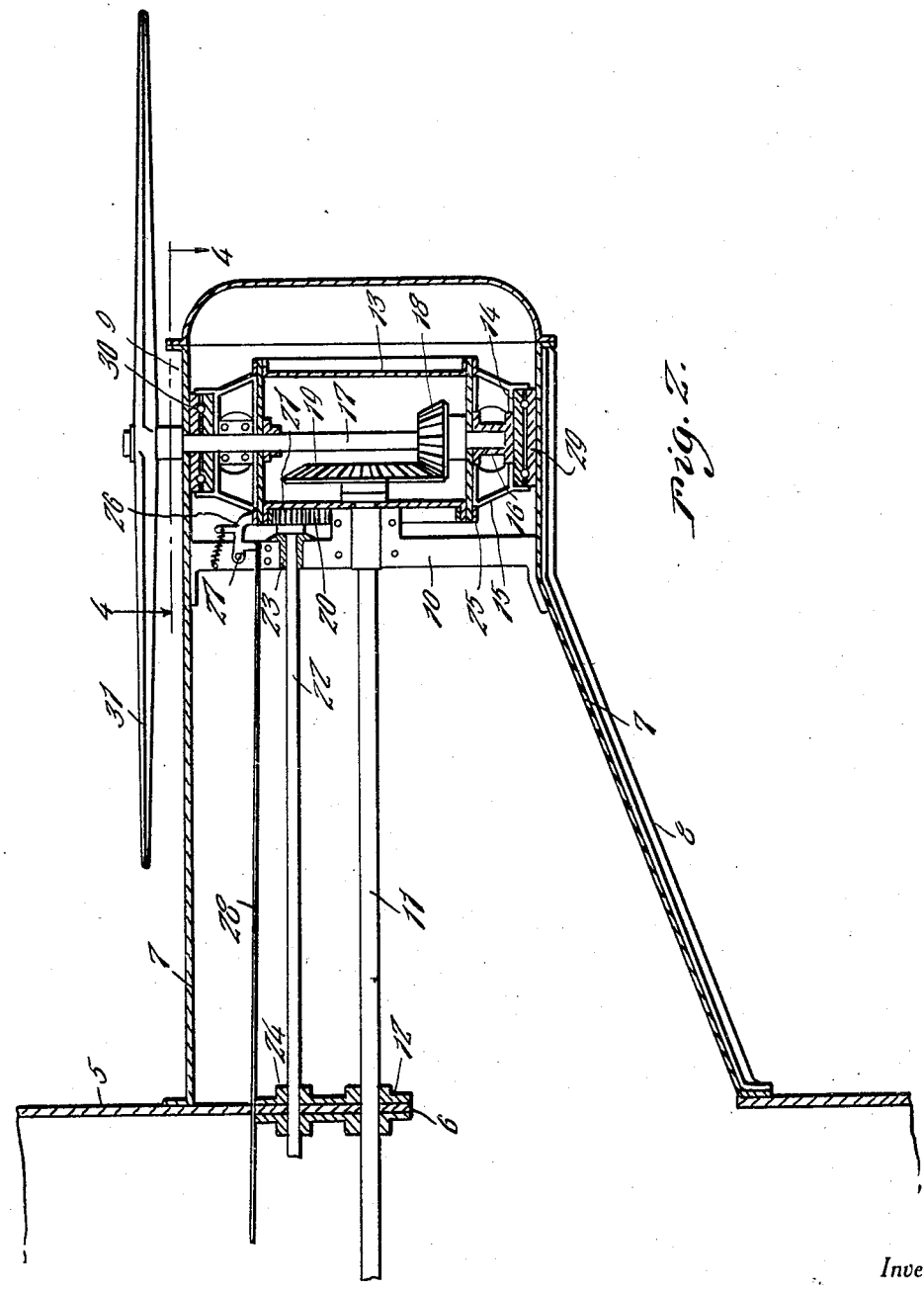

March 24, 1931. B. STREICHERT 1,798,006
AIRCRAFT PROPULSION
Filed April 2, 1930 3 Sheets-Sheet 3
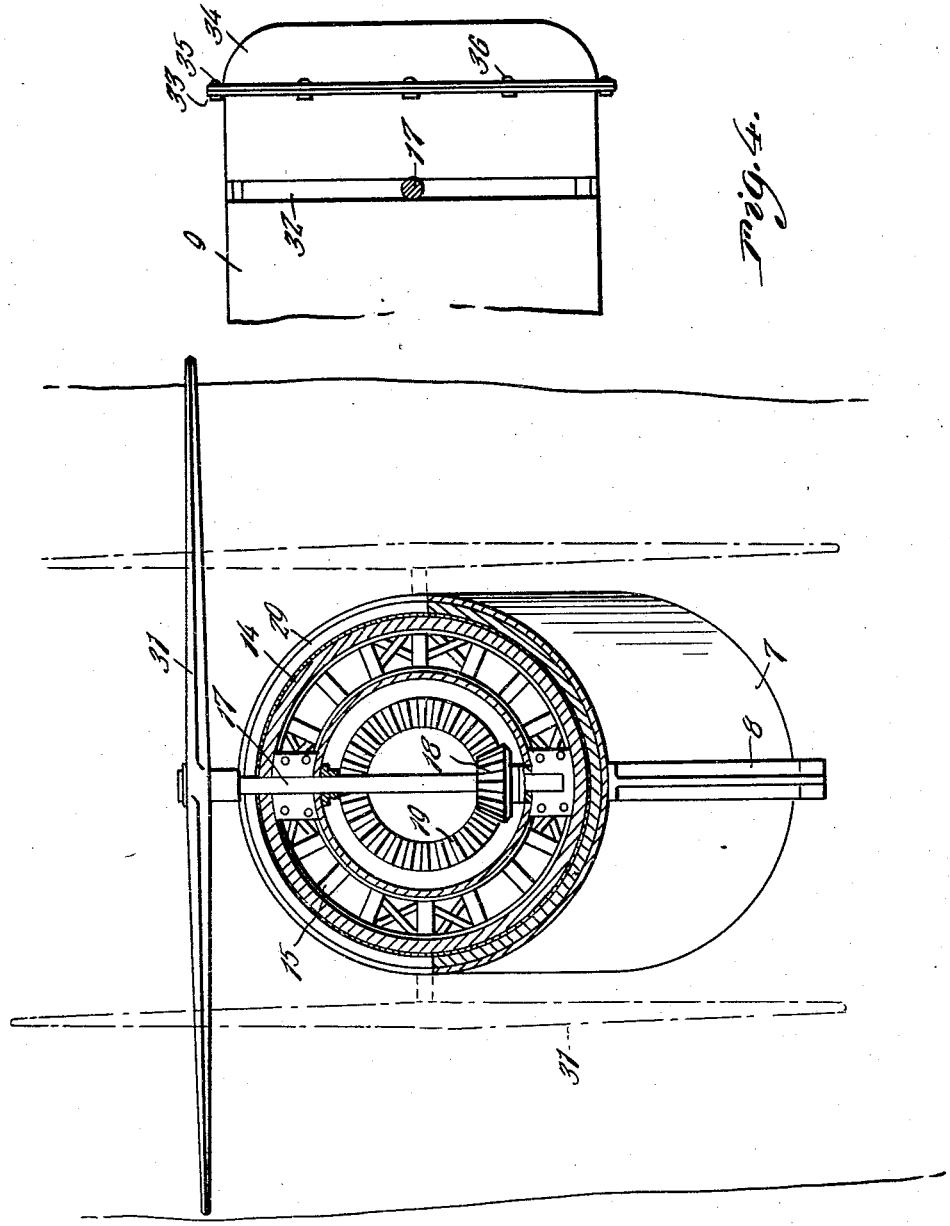
Inventor
B. Streichert
By Clarence A. O'Brien
Attorney Patented Mar. 24, 1931

1,798,006

UNITED STATES PATENT OFFICE

BERTHA STREICHERT, OF ASTORIA, OREGON, ASSIGNOR TO NATIONAL AIRCRAFT CO., LTD., A CORPORATION OF NEVADA

AIRCRAFT PROPULSION

Application filed April 2, 1930. Serial No. 441,018.

This invention appertains to new and useful improvements in the general art of aeronautics, and more particularly to novel propulsion means of the propeller type.

The principal object of this invention is to provide propellers including means whereby the same may be adjusted for lifting the aircraft vertically, for driving the same forwardly, assisting in stabilizing the aircraft while in flight, and applying a downward thrust in descending or landing.

During the course of the following specification and claims, other important objects and advantages of the invention will readily become apparent to the reader.

In the drawings:—

Figure 1 represents a side elevational view of the propeller and mount therefor, looking toward the body of the aircraft.

Fig. 2 represents a horizontal plan sectional view taken substantially on the line 2—2 of Fig. 1 looking in the direction of the arrows.

Fig. 3 represents a vertical sectional view through the outer end portion of the mount, showing the adjustment means for the propeller.

Fig. 4 represents a fragmentary sectional view taken substantially on the line 4—4 of Fig. 2.

Fig. 5 represents a vertical sectional view taken substantially through the outer end portion of the propeller mount on a vertical plane.

Referring to the drawings wherein like numerals designate like parts, it can be seen that numeral 5 represents the side wall of an aircraft, the same being provided with an opening 6 therein, to permit members of the ship crew to pass out into the shaft housing 7.

The shaft housing is constructed of suitable sheet material, reinforced at its bottom and front as at 8. Any suitable character of frame may be employed for supporting the sheet material 7, in fact, the housing may be actually constructed of sheet pure aluminum in the usual manner.

The nose portion 9 of the housing is reduced and within this portion of the housing, the spider 10 is mounted for supporting one end of the shaft 11, the shaft 11 being disposed through the bearing 12 in the adjacent side wall 5 of the air craft, said shaft 11 being connected with the motive power located inside of the body of the aircraft.

A circular box 13 is mounted within the annulus 14, suitable struts 15 being employed to connect the box 13 to the said annulus in spaced relation thereto.

Interposed between the box 13 and the annulus 14 is a bearing structure 16 for receiving one end of the shaft 17, which is provided with a beveled gear 18 meshing with the beveled gear 19 on the end of the shaft 11, protruding into the box 13.

The box 13 is provided with a ring gear 20 at its inner side, that is, the side thereof adjacent the spider 10 and meshing with the teeth of this ring gear is the pinion 21, which is located on one end of the shaft 22, which extends through a bushing 23 in the spider 10.

This shaft 22 also extends through a bearing 24 on the side 5 of the aircraft. A band 25 circumscribes the last-mentioned end of the box 13 and engageable with this band, is the brake element 26, which is pivotally mounted as at 27 on the spider 10.

A control rod 28 is slidable through an opening in the side wall 5 and connects to the brake element 26 so that the same may be brought to bear against the band 15 to secure the box 13 in a predetermined position, and connected with the mechanism for adjusting the box 13 and propeller 31 to any pitch or elevation desired.

A second annulus 29 circumscribes the annulus 14 and is suitably secured to the inner side of the portion 9 of the mounting 7. Interposed between the annular member 14 and the annular member 29, are the ball bearings 30. A screw propeller 31 is secured in the usual manner to the outer end of the shaft 17, and as is apparent in Fig. 4, the outer annulus 29 is provided with an elongated circumferentially extending slot registering with the slot 32 thru the portion 9 of the housing 7 through which the shaft 17 projects and in which the same is adjustable, as required, by means of manual, compressed air or electrical force.

As is apparent in Fig. 4, the outer end of the housing 7 is open and flanged as at 33, while a cap 34 is provided with a flange 35 which abuts the flange 33, and these flanges are secured together by means 36.

While the foregoing specification sets forth the invention in detail, it is to be understood that numerous changes in the shape, size and materials, may be resorted to without departing from the spirit and scope of the invention as claimed hereinafter.

Having thus described my invention, what I claim as new is:—

1. In an aircraft of the character described comprising an aircraft body, said body being provided with an opening, a casing projecting outwardly from the body and circumventing its opening at its inner end, a rotatably mounted box within the outer end of said casing, a diametrically disposed shaft extending through the said box, a shaft projecting thru the said casing, and into the said box, gear means between the last-mentioned shaft and the first-mentioned shaft, and means for rotating the said box to adjust the said propeller, from a horizontal to a vertical position in both directions.

2. In an aircraft of the character described comprising an aircraft body, said body being provided with an opening, a casing projecting outwardly from the body and circumventing the opening at its inner end, a rotatably mounted box within the outer end of said casing, a diametrically disposed shaft extending through the said box, a shaft projecting through the said casing, and into the said box, gear means between the last-mentioned shaft and the first-mentioned shaft, means for rotating the said box to adjust the said propeller, and a brake for stopping and retaining the box in an adjusted position.

3. An aircraft propeller comprising a drive shaft, a driven shaft, gear means between the drive shaft and driven shaft, a drum for carrying the driven shaft, means for rotating the drum, a smooth band on the drum, and a brake engageable with the said band.

In testimony whereof I affix my signature.

BERTHA STREICHERT.